US011880837B2

(12) United States Patent
Sukhija et al.

(10) Patent No.: US 11,880,837 B2
(45) Date of Patent: Jan. 23, 2024

(54) SYSTEM AND COMPUTER-IMPLEMENTED METHOD FOR DYNAMIC MERCHANT CONFIGURATION IN A PAYMENT TERMINAL FOR TRANSACTING IN A VIRTUAL ENVIRONMENT

(71) Applicant: Visa International Service Association, San Francisco, CA (US)

(72) Inventors: Rohit Sukhija, Bengaluru (IN); Gaurav Srikant Mokhasi, Evanston, IL (US)

(73) Assignee: Visa International Service Association, San Francisco, CA (US)

( * ) Notice: Subject to any disclaimer, the term of this patent is extended or adjusted under 35 U.S.C. 154(b) by 51 days.

(21) Appl. No.: 17/355,274

(22) Filed: Jun. 23, 2021

(65) Prior Publication Data
US 2021/0319443 A1  Oct. 14, 2021

Related U.S. Application Data

(63) Continuation of application No. 16/559,786, filed on Sep. 4, 2019, now Pat. No. 11,080,702.

(51) Int. Cl.
*G06Q 20/40* (2012.01)
*G06Q 20/34* (2012.01)

(52) U.S. Cl.
CPC ............ *G06Q 20/40* (2013.01); *G06Q 20/34* (2013.01)

(58) Field of Classification Search
None
See application file for complete search history.

(56) References Cited

U.S. PATENT DOCUMENTS

| 8,190,733 | B1* | 5/2012 | Hoffman | G06F 3/04815 |
| | | | | 709/224 |
| 8,271,392 | B2* | 9/2012 | Tomchek | G06Q 40/12 |
| | | | | 705/64 |
| 9,824,391 | B2* | 11/2017 | Glazer | G06Q 30/0643 |
| 10,685,379 | B2* | 6/2020 | Purves | G06Q 20/3224 |
| 10,719,597 | B2* | 7/2020 | Sonkar | G09C 5/00 |
| 2015/0012394 | A1* | 1/2015 | Rossi | G06Q 30/0643 |
| | | | | 705/27.2 |
| 2016/0109954 | A1 | 4/2016 | Harris et al. | |
| 2016/0335289 | A1* | 11/2016 | Andrews | G06Q 50/16 |
| 2016/0350745 | A1* | 12/2016 | Wilkes | G06Q 20/342 |

(Continued)

*Primary Examiner* — Christopher Bridges
(74) *Attorney, Agent, or Firm* — The Webb Law Firm

(57) ABSTRACT

The present invention relates to a system and computer implemented method for dynamic merchant configuration in a payment terminal for transacting in a virtual environment. The payment terminal receives a location information of a virtual user corresponding to a physical user performing a transaction in one of the one or more establishments configured in a virtual environment from a Virtual Reality (VR) device. Further, merchant and associated details corresponding to one of the one or more establishments is determined based on the location information upon the physical user initiating payment for the transaction using a physical payment card. Thereafter, a transaction message comprising the merchant and associated details is sent to an issuer system via a gateway associated with the merchant for authorization. Finally, a result of authorization of the transaction message is received from the issuer system via the gateway.

15 Claims, 6 Drawing Sheets

| VIRTUAL CO-ORDINATES | MERCHANT NAME | MERCHANT ID | ACQUIRER BANK DETAILS | GATEWAY DETAILS | MERCHANT CATEGORY |
|---|---|---|---|---|---|
| XYZ1 | NAME-1 | ID-1 | BANK DETAILS-1 | GATEWAY-1 | CATEGORY-1 |
| XYZ2 | NAME-2 | ID-2 | BANK DETAILS-2 | GATEWAY-2 | CATEGORY-2 |
| XYZN | NAME-N | ID-3 | BANK DETAILS-N | GATEWAY-N | CATEGORY-N |

(56) References Cited

U.S. PATENT DOCUMENTS

| | | | | |
|---|---|---|---|---|
| 2017/0039613 A1* | 2/2017 | Kaehler | ............. | G02B 27/0172 |
| 2017/0115742 A1* | 4/2017 | Xing | .................... | G06F 3/0485 |
| 2017/0364920 A1* | 12/2017 | Anand | ................ | H04L 63/0861 |
| 2019/0156404 A1* | 5/2019 | Gabriele | ................ | G06Q 20/12 |
| 2019/0188672 A1* | 6/2019 | Charles | ................ | G06Q 20/204 |

\* cited by examiner

| VIRTUAL CO-ORDINATES | MERCHANT NAME | MERCHANT ID | ACQUIRER BANK DETAILS | GATEWAY DETAILS | MERCHANT CATEGORY |
|---|---|---|---|---|---|
| XYZ1 | NAME-1 | ID-1 | BANK DETAILS- 1 | GATEWAY - 1 | CATEGORY - 1 |
| XYZ2 | NAME-2 | ID-2 | BANK DETAILS- 2 | GATEWAY - 2 | CATEGORY - 2 |
| ⋮ | ⋮ | ⋮ | ⋮ | ⋮ | ⋮ |
| XYZN | NAME-N | ID-3 | BANK DETAILS- N | GATEWAY - N | CATEGORY - N |

SYSTEM AND COMPUTER-IMPLEMENTED METHOD FOR DYNAMIC MERCHANT CONFIGURATION IN A PAYMENT TERMINAL FOR TRANSACTING IN A VIRTUAL ENVIRONMENT

CROSS REFERENCE TO RELATED APPLICATION

This application is a continuation application of U.S. patent application Ser. No. 16/559,786, filed Sep. 4, 2019, the disclosure of which is hereby incorporated by reference in its entirety.

TECHNICAL FIELD

The present disclosure relates to electronic commerce. Particularly, but not exclusively, the present disclosure relates to a system and method for dynamic merchant configuration in a payment terminal for transacting in a virtual environment.

BACKGROUND

As virtual reality (VR) devices become increasingly affordable and available to users, banks and payment companies have more opportunities to engage their users in virtual world. Users are generally keen to experience the environment of shopping (for example physically walk around in a shopping mall or a store) and desire the ease of performing transactions using electronic commerce. Hence, there exists virtual reality devices that provide users a virtual environment for shopping. The users may roam around in a virtual environment and order consumables or goods to be delivered to them. For payments in a virtual environment, users must add their card on file to buy the consumables or goods. In a card on file system, the card details of the user are stored in a digital format for further use in a VR device or the virtual environment provider without needing to present a card.

An issue with the card on file technique for payments in a virtual environment is the security of the stored card information. Further, card on file techniques increase the risk of fraud and identity theft for a shared resource such as an arcade or a virtual reality game. Thus, using a physical card for payments in a virtual environment is more secure and preferred by the consumer.

Another issue with the existing techniques is that the payment terminal cannot dynamically configure the merchant gateway based on the user location in the virtual environment for completing the payment transaction.

Another issue with the existing techniques is that payments are made in a virtual environment and a vendor and/or manufacturer of the VR device may have to initiate the transaction to merchant in the physical environment, hence increasing intermediaries.

The information disclosed in this background of the disclosure section is only for enhancement of understanding of the general background of the invention and should not be taken as an acknowledgement or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

Disclosed herein is a computer implemented method for dynamic merchant configuration in a payment terminal for transacting in a virtual environment. In an embodiment, the method may include receiving, by the payment terminal, a location information of a virtual user corresponding to a physical user performing a transaction in one of the one or more establishments configured in a virtual environment from a Virtual Reality (VR) device. Further, the method includes determining merchant and associated details corresponding to one of the one or more establishments based on the location information upon the physical user initiating payment for the transaction using a physical payment card in the payment terminal. Furthermore, the method includes sending a transaction message comprising the merchant and associated details to an issuer system via a gateway associated with the merchant for authorization. Finally, the method includes receiving a result of authorization of the transaction message from the issuer system via the gateway.

Further, in an embodiment, the present disclosure may include a method for dynamic merchant configuration in a payment terminal for transacting in a virtual environment. The method includes identifying, by the Virtual Reality (VR) device, location information of a virtual user corresponding to a physical user performing a transaction in one of the one or more establishments configured in a virtual environment. Further, the method includes determining merchant and associated details corresponding to one of the one or more establishments based on the location information. Furthermore, the method includes sending the merchant and associated details to a payment terminal upon the physical user initiating payment for the transaction using a physical payment card in the payment terminal. Thereafter, the payment terminal sends the transaction message comprising the merchant and associated details to an issuer system via a gateway associated with the merchant for authorization. Finally, the payment terminal receives a result of authorization of the transaction message from the issuer system via the gateway.

Furthermore, in an embodiment the present disclosure may include a payment terminal, for dynamic merchant configuration. The payment terminal includes a processor and a memory communicatively coupled to the processor. The memory stores the processor instructions, which, on execution, causes the processor to receive a location information of a virtual user corresponding to a physical user performing a transaction in one of the one or more establishments configured in a virtual environment from a Virtual Reality (VR) device. Further, the processor is configured to determine merchant and associated details corresponding to one of the one or more establishments based on the location information upon the physical user initiating payment for the transaction using a physical payment card in the payment terminal. Furthermore, the processor is configured to send a transaction message comprising the merchant and associated details to an issuer system via a gateway associated with the merchant for authorization. Finally, the processor is configured to receive a result of authorization of the transaction message from the issuer system via the gateway.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
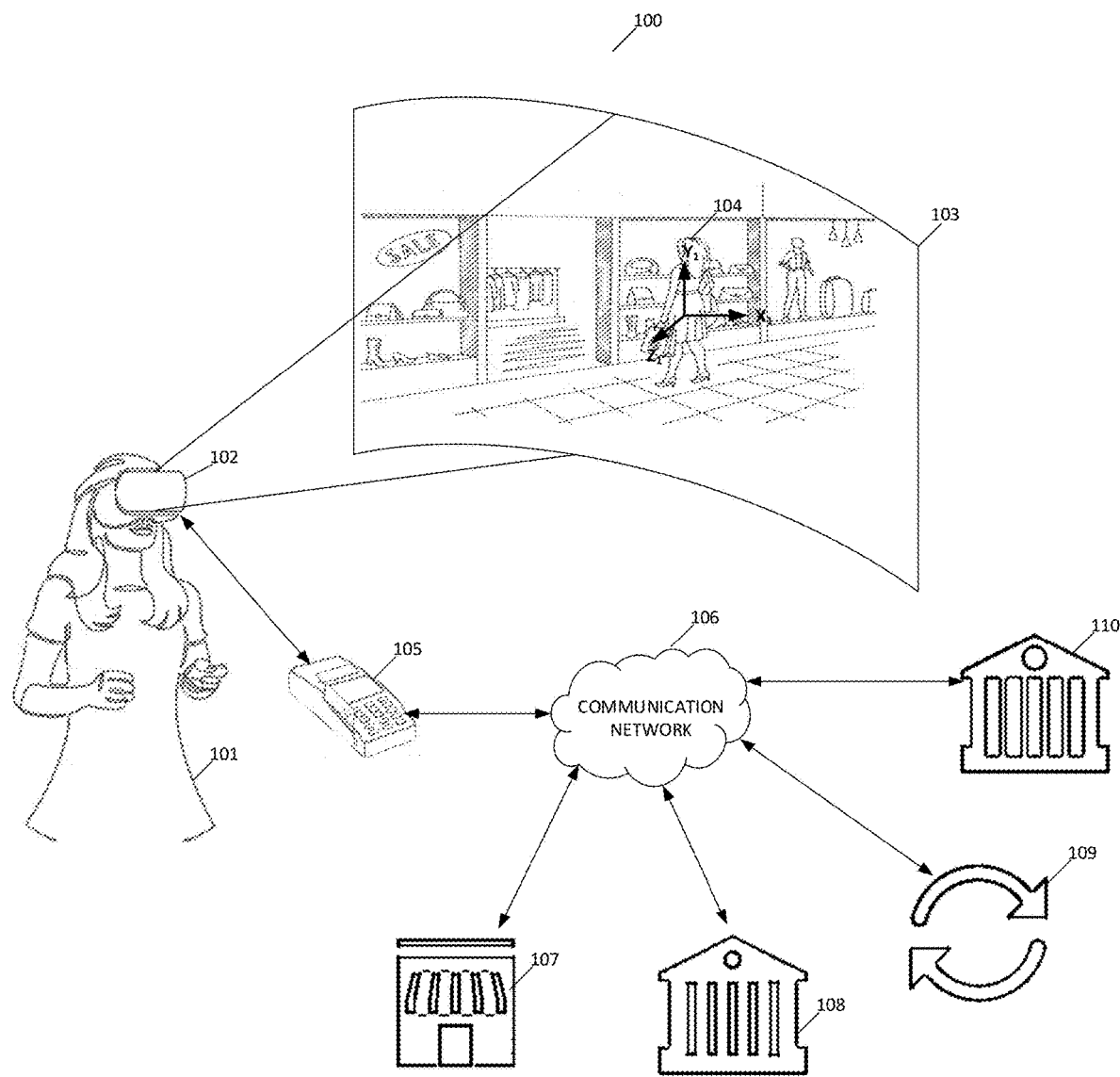
FIG. 1 shows an exemplary environment for transacting in a virtual environment using a physical payment terminal, in accordance with an embodiment of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure relates to system and computer implemented method for dynamic merchant (107) configuration in a payment terminal (105) for transacting in a virtual environment (103). In an embodiment, the method may include receiving a location information (304) of a virtual user (104) corresponding to a physical user (101) performing a transaction in one of the one or more establishments configured in a virtual environment (103) from a Virtual Reality (VR) device (102). Further, the method may include determining a merchant (107) and associated details corresponding to one of the one or more establishments based on the location information (304) upon the physical user (101) initiating payment for the transaction using a physical payment card in the payment terminal (105). Furthermore, the method may include sending a transaction message comprising the merchant (107) and associated details to an issuer system (110) via a gateway associated with the merchant (107) for authorization. Finally, the method may include receiving a result of authorization of the transaction message from the issuer system (110) via the gateway.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment (100) for transacting in a virtual environment (103) using a physical payment terminal (105), in accordance with an embodiment of the present disclosure.

In some implementation, a physical user (101) is equipped with a Virtual Reality (VR) device (102). The physical user (101) is capable of interacting with the VR device (102) using for example a joystick, voice commands and/or Internet of Things (IoT) devices. The IoT devices in the internet of things, are nonstandard computing devices that connect wirelessly to a network and have the ability to transmit data. In an embodiment, the VR device (102) includes a display unit (not shown in FIG. 1) for rendering a virtual environment (103) to the physical user (101). A virtual user (104) is a program that perform actions like a real user based on the inputs from the physical user (101). The virtual user (104) is a representation of the physical user (101) in the virtual environment (103). The virtual user (104) may navigate in a virtual environment (103) and perform a transaction in one or more establishments (for example, virtual shops like a restaurant, an accessory shop and the like) present in the virtual environment (103). The virtual environment (103) is an interactive computer-generated experience taking place within a simulated environment rendered to the physical user (101) using the VR device (102). Further, the physical user (101) can initiate a payment for the transaction using a physical payment card (for example a credit card) in the payment terminal (105). In an embodiment the payment terminal (105) can be a Point of Sale (POS) device.

The VR device (102) and the payment terminal (105) are communicably connected through at least one of a wired and a wireless network. In one embodiment, the VR device (102) and the payment terminal (105) can be considered as a single unit. For example, a vendor can manufacture a VR device (102) and the payment terminal (105) such that the VR device (102) is communicatively coupled with the payment terminal (105). In another embodiment, the VR device (102) and the payment terminal (105) can be independent, such that each device can be communicatively coupled with each other. In an example embodiment, consider a shopping mall scenario, a vendor in the shopping mall may facilitate the VR device (102) and a communicatively connected payment terminal (105). The VR device (102) may be configured with a virtual environment (103) having a plurality of shops present in the mall. A physical user (101) in the mall may use the VR device (102) to virtually explore the shops in the mall using the virtual environment (103). If the physical user (101) is interested in transacting in a particular shop, say "SHOP 1", then the physical user (101) may make a gesture or provide an indication through the virtual user (104) in the virtual environment (103) to initiate a transaction. In an embodiment, the gesture or indication may be provided by the actions performed by the physical user (101) and a speech command provided by the physical user (101). Alternatively, a specific transaction button may be provided in the VR device (102) such that the physical user (101) can initiate the transaction by pushing the transaction button. Upon initiating the transaction in the virtual environment (103), the physical user (101) may use a physical card (e.g., credit card, payment card, gift card, debit card, prepaid cards, and the like) in the payment terminal (105) to initiate the transaction in the physical environment.

In an embodiment, the VR device (102) sends 360-degree virtual coordinates of the virtual user (104) to the payment terminal (105). Further, the payment terminal (105) extracts a merchant (107) and associated details corresponding to the virtual coordinates of the virtual user (104), from a mapping table (205). In one embodiment, the mapping table (205) can be stored in the payment terminal (105). In another embodiment, the mapping table (205) can be stored in the VR device (102). In another embodiment, the mapping table (205) can be stored in a cloud-based database and is communicatively coupled to either the VR device (102) or the payment terminal (105). In an embodiment, each establishment in the virtual environment (103) is mapped to a merchant (107) in the mapping table (205). For example, an establishment named "SHOP1" can be mapped to merchant (107) named "merchant 1" in the mapping table (205). The "SHOP1" may be establishment selling goods or products for example an electronics store, a restaurant and the like and the "merchant 1" may be a person or a company selling the goods or products in the "SHOP1". In an embodiment, each establishment in the virtual environment (103) is associated with coordinates. For example, cartesian coordinates (XYZ) can be associated with an establishment. Likewise, in an embodiment, every object (for example a SHOP and a product or good in the store) in the virtual environment is associated with coordinates (location information (304)). In an embodiment, any point in the virtual environment (103) can be represented using coordinates. Likewise, movement of the virtual user (104) can also be detected using coordinates of the virtual user (104) for example (XYZ1). If location information (304) of the virtual user (104) matches location information (304) of an establishment, the VR device (102) can infer that the virtual user (104) is in the establishment.

In an embodiment when the mapping table (205) is stored in VR device (102), the VR device (102) extracts the merchant (107) and associated details corresponding to 360-degree virtual coordinates of the virtual user (104) using the information stored in a mapping table (205). Further, the extracted merchant (107) and associated details is sent to the payment terminal (105). In another embodiment, when the mapping table (205) is stored in the payment terminal (105), the VR device (102) sends the 360-degree virtual coordinates of the virtual user (104). Further, the VR device (102) can also send transaction details to the payment terminal (105). For example, consider an accessory in an establishment is worth 100USD. When the virtual user (104) initiates a transaction for the accessory, the 360-degree virtual coordinates along with transaction information (e.g., accessory ID, accessory name, number of units, total amount, time, etc.) are sent to the payment terminal (105). In a further embodiment, physical location information (304) of the physical user (101) can also be sent to the payment terminal (105).

In some implementation, the payment terminal (105), a merchant (107), an acquirer (108), a network server (109) and an issuer system (110) are interconnected using a communication network (106) for sending and receiving the information regarding the payment transaction. The merchant (107) is any business entity that is authorized to accept physical payment card as payment for goods and services. An acquirer (108) is a financial institution that contracts with merchants (107) to accept physical payment card as payment for good and services. An issuer system (110) issues physical payment card and contracts with its cardholders for billing and payment of transactions. Further, the issuer system (110) is a financial institution that maintains the relationship between card holder and a network server (109), such as Visa. The network server (109) is a part of collection of systems that may include an authorization service through which issuer system (110) can approve or decline individual physical payment card payment transactions. Further, the network server (109) may be programmed or configured for clearing and settlement service that processes transactions electronically between acquirers (108) and issuer systems (110) to ensure that payment transaction information moves from acquirers (108) to issuer systems (110) for posting to cardholders' accounts and payment for the transactions moves from issuer systems (110) to acquirers (108) to be credited to the merchant (107) accounts.

In the present disclosure the terms "card issuer" and "issuer system" are used interchangeably.

Further, the communication network (106) may include, for example, a direct interconnection, e-commerce network, a peer to peer (P2P) network, local area network (LAN), wide area network (WAN), wireless network (e.g., using Wireless Application Protocol), the Internet, Wi-Fi, cellular network, etc.

In an embodiment, the payment terminal (105) initiates the payment for the transaction upon the physical user (101) presenting a physical payment card. In one embodiment, the merchant (107) enters the amount for the transaction and sends an authorization request to the acquirer (108). In another embodiment, the payment terminal (105) can receive transaction details including the amount for transaction from the VR device (102). A merchant (107) system (not shown) associated with the payment terminal (105) generates an authentication and/or authorization request and sends the authentication and/or authorization request to the acquirer (108). The acquirer (108) sends the authentication and/or authorization request to network server (109) and the network server (109) forwards the authentication and/or authorization request to the issuer system (110). Further, the issuer system (110) provides a response to the authentication and/or authorization request. The network server (109) forwards the issuer system's (110) authorization response to the acquirer (108) and the acquirer (108) forwards the authorization response to the merchant (107) system. Finally, the merchant (107) system completes the transaction by displaying an appropriate message on the payment terminal (105). In an embodiment, the described transaction can be considered as an electronic transaction.

Figure 2:
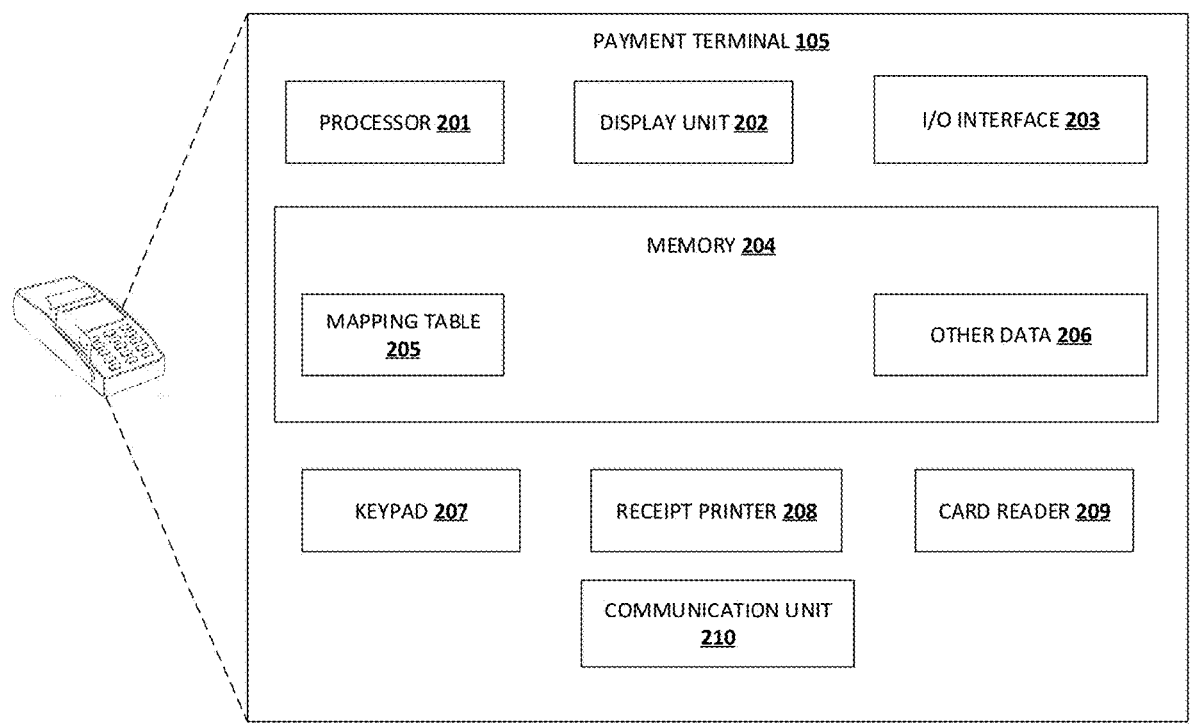
FIG. 2 shows a simplified block diagram of the payment terminal for transacting in a virtual environment, in accordance with embodiments of the present disclosure.

FIG. 2 shows a simplified block diagram of the payment terminal (105), in accordance with embodiments of the present disclosure.

In an embodiment, the payment terminal (105) may include at least one Central Processing Unit ("CPU" or "processor") (201) and a memory (204) storing instructions executable by the at least one processor (201). The processor (201) may comprise at least one data processor for executing program components for executing user or system-generated requests. The memory (204) is communicatively coupled to the processor (201). The payment terminal (105) further comprises an Input/Output (I/O) interface (203). The I/O interface (203) is coupled with the processor (201) through which an input signal or/and an output signal is communicated.

In one embodiment, the payment terminal (105) may include, for example, a display unit (202), a keypad (207), a receipt printer (208), a card reader (209), and/or a communication unit (210). It will be appreciated that such aforementioned units may be represented as a single unit or a combination of different units. The payment terminal (105) may further include other modules, which are not depicted, that are used during operation of the payment terminal (105).

In an embodiment, the display unit (202) may be housed on the payment terminal (105) and communicatively coupled to the processor (201). The display unit (202) may be used to display various information like merchant details, payment amount of an ongoing transaction, authorization response from the issuer system (110) for example success or failure.

In an embodiment, the keypad (207) may be housed on the payment terminal (105) and communicatively coupled to the processor (201). The keypad (207) may be used to receive the input from user or customer. The input from the user or customer may include transaction amount, secure pin used for authorizing the customer or the user. In an embodiment, keypad (207) may be implemented as a digital or virtual keypad on display unit (202). For example, display unit (202) may include touch-sensitive inputs that detect user inputs.

In an embodiment, the receipt printer (208) may be housed on the payment terminal (105) and communicatively coupled to the processor (201). The receipt printer (208) may be used to generate a hard copy (paper copy) of the transaction details including the merchant (107) and associated details, the details regarding the gateway, details of the physical payment card, the payment amount of a transaction and/or the result of a transaction.

In an embodiment, the card reader (209) may be housed on the payment terminal (105) and communicatively coupled to the processor (201). The card reader (209) may be capable of extracting the details of the physical payment card used for making payments. The details of the physical payment card may include primary account number and issuer identification number. The card reader (209) extracts the details of the physical payment card using information encoded in the magnetic stripe on the physical payment card or using information stored on integrated circuits. In another embodiment, card reader (209) may be capable of extracting the details of the physical payment card via a wireless communication between the physical payment card and the card reader (209), such as via Near-Field Communication (NFC), Bluetooth, or a similar wireless protocol.

In an embodiment, the communication unit (210) may be programmed or configured for sending and receiving information with the merchant (107).

In one embodiment, the data stored in the memory (204) may include a mapping table (205), and other data (206).

Figure 6:
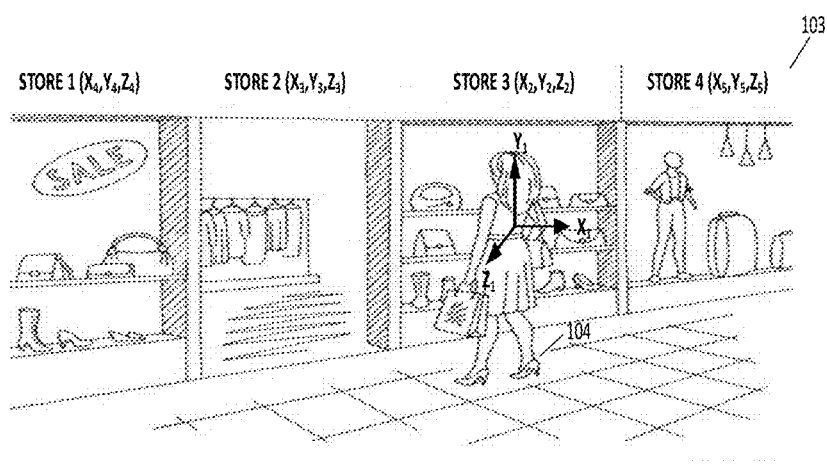
FIG. 6 shows an exemplary mapping table associated with a virtual environment, in accordance with an embodiment of the present disclosure.

FIG. 6 shows an example of a mapping table (205) according to one embodiment. The mapping table (205) may include at least one of a merchant details, merchant ID and/or acquirer (108) bank details. Further the mapping table (205) may also include merchant name, virtual coordinates of the virtual user (104), gateway details and/or merchant category In an embodiment, for example the merchant details may include demographic information (for example Address, Zip code, telephone number, email id and the like), merchant ID may be a number (for example "949400444000"), acquirer bank details may be "Bank of LMN", the merchant name may be "ADC", virtual coordinates may be (XYZ1), gateway details may be "Gateway1" and merchant category may be "5172".

In an embodiment, other data (206) may include information necessary for encrypting and decrypting transaction messages and location information of the payment terminal (105).

Figure 3:
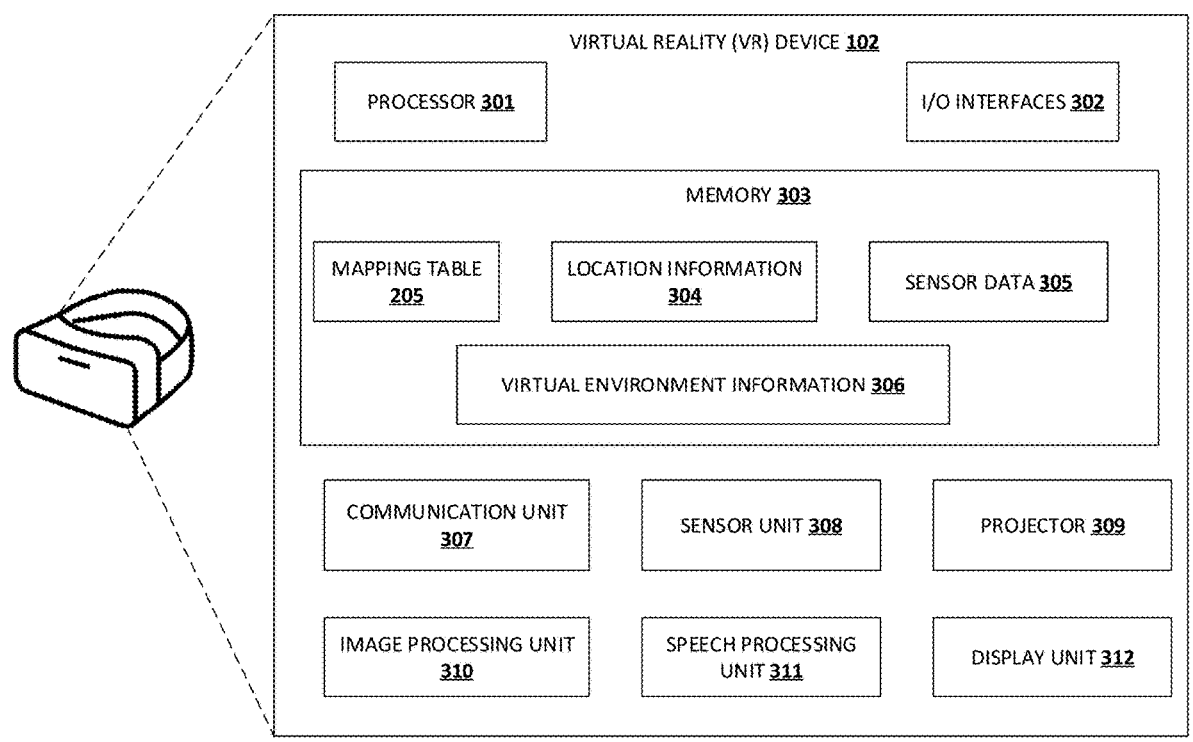
FIG. 3 shows a simplified block diagram of the virtual reality device for transacting in a virtual environment, in accordance with embodiments of the present disclosure.

FIG. 3 shows a detailed block diagram of the virtual reality device (102), in accordance with embodiments of the present disclosure.

The Virtual Reality (VR) device (102) may include at least one Central Processing Unit ("CPU" or "processor") (301) and a memory (303) storing instructions executable by the at least one processor (301). The processor (301) may comprise at least one data processor for executing program components for executing user or system-generated requests. The memory (303) is communicatively coupled to the processor (301). The VR device (102) further comprises an Input/Output (I/O) interface (302). The I/O interface (302) is coupled with the processor (301) through which an input signal or/and an output signal is communicated.

In an embodiment, the VR device (102) may include a communication unit (307), sensor unit (308), a projector (309), an image processing unit (310), a speech processing unit (311), a display unit (312).

In an embodiment, the communication unit (307) is housed on the VR device (102) and is programmed or configured for receiving information from the one or more sensors associated with the VR device (102). Further, the communication unit (307) may be programmed or configured for sending and receiving information to the payment terminal (105). The communication unit (307) may include a wired or wireless interface for communicating with the one or more sensors associated with the VR device (102) and the payment terminal (105).

In an embodiment, the sensor unit (308) may be housed on the VR device (102) or present external to the VR device (102) and communicatively coupled to the processor (301). The sensor unit (308) may include one or more sensors associated with the VR device (102). Examples of the one or more sensors include an image capturing unit, a microphone, an eye tracking sensor, a motion tracking sensor, an infrared sensor, a joystick, a game controller, and a head motion tracking sensor.

In an embodiment, the projector (309) is housed on the VR device (102) and communicatively coupled to the processor (301). The projector (309) is used to project the virtual environment (103) on to the display unit (312) of the VR device (102). The projector (309) is configured to project the virtual environment (103) on the display unit (312).

In an embodiment, the image processing unit (310) is housed on the VR device (102) and communicatively coupled to the processor (301). The image processing unit (310) is programmed or configured for analyzing the images captured by the image capturing unit or an infrared sensor and analyze the actions performed by the physical user (101) for navigating the virtual user (104) in the virtual environment (103) or control the actions of the virtual user (104) in the virtual environment (103).

In an embodiment, the speech processing unit (311) is housed in the VR device (102) and communicatively coupled to the processor (301). The speech processing unit (311) is programmed or configured for analyzing the speech signals captured by a microphone and further identify the commands given by the physical user (101) to navigate the virtual user (104) or control the actions of the virtual user (104) in the virtual environment (103).

In an embodiment, the display unit (312) is housed in the VR device (102) and communicatively coupled to the processor (301). The display unit (312) displays the virtual environment (103) projected by the projector (309) to the physical user (101). In an embodiment, the display unit (312) can be a flat display or a curved display. The curved display can be used to enhance immersion to the physical user (101).

In one embodiment, the data stored in the memory (303) may include a mapping table (205), a location information (304), a sensor data (305) and a virtual environment information (306).

In an embodiment, the mapping table (205) as shown in table of FIG. 6 may include at least one of merchant details, merchant ID and acquirer (108) bank details. Further the mapping table (205) as shown in table of FIG. 6 may also include merchant name, virtual coordinates of the virtual user (104), gateway details and merchant category.

In an embodiment, the location information (304) includes the virtual coordinates of the virtual user (104) in the virtual environment (103). The location information (304) is updated upon the virtual user (104) navigating in the virtual environment (103) based on the inputs from the physical user (101).

In an embodiment, the sensor data (305) includes the one or more signals received from the sensor unit (308) used to control the virtual user (104) in the virtual environment (103).

In an embodiment, the virtual environment information includes details regarding the positions of the establishments in the virtual environment (103), the position of the goods or the consumables in the virtual environment (103). Further, the virtual environment information includes details regarding the goods or the consumables for example product details, price associated with the goods, any offers associated with the goods.

Figure 4:
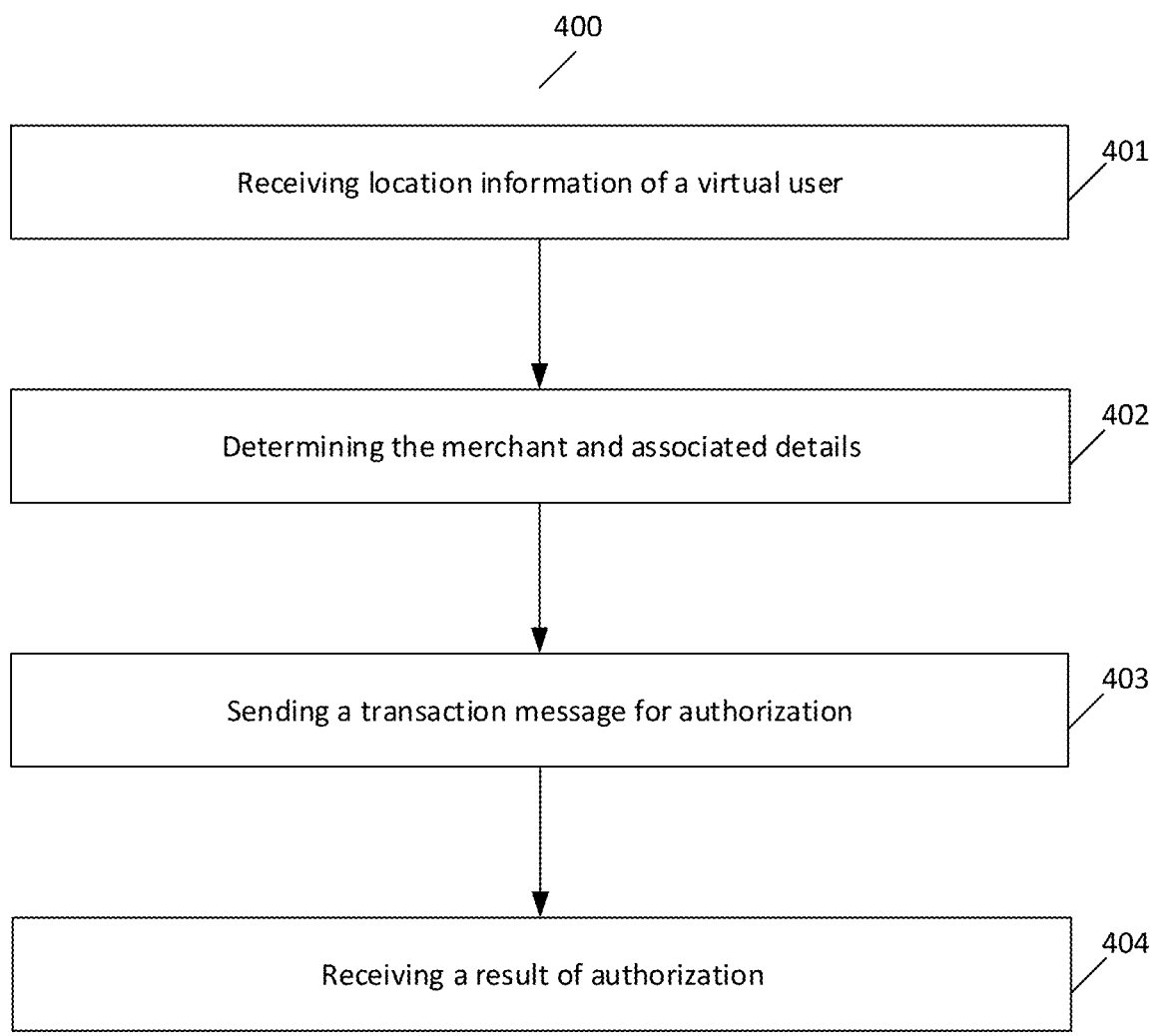
FIG. 4 shows a flow chart illustrating method steps for dynamic merchant configuration in a payment terminal for transacting in a virtual environment, in accordance with an embodiment of the present disclosure.

FIG. 4 shows a flow chart illustrating method steps for dynamic merchant (107) configuration in a payment terminal (105) for transacting in a virtual environment (103), in accordance with an embodiment of the present disclosure.

The order in which the method 400 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

As illustrated in FIG. 4, the method 400 may comprise one or more steps for dynamic merchant (107) configuration in a payment terminal (105) for transacting in a virtual environment (103). The physical user (101) equipped with a virtual reality device (102) includes a virtual environment (103) and a virtual user (104) navigating in a virtual environment (103). The virtual user (104) may purchase or order consumables or goods from one or more establishments in the virtual environment (103) and the physical user (101) presents a physical payment card to the payment terminal (105) for the payment. Further, the payment terminal (105) completes the payment process.

At the step 401, the payment terminal (105) receives the location information (304) of the virtual user (104) corresponding to the physical user (101) performing a transaction in one of the one or more establishments configured in a virtual environment (103) from a Virtual Reality (VR) device (102). The location information (304) of the virtual user (104) includes 360-degree virtual coordinates of the user in a three-dimensional virtual environment (103). For example, making reference to FIG. 6, let (XYZ1) represent the virtual coordinates of the virtual user (104) and the virtual coordinates (XYZ2) represent virtual coordinates of an establishment or shop. Upon the virtual user (104) initiating a buying of the goods or the consumables based on the actions performed by the physical user (101) or the voice command issued by the physical user (101) or pressing the transaction button housed on the VR device (102), the virtual coordinates of the virtual user (104) (XYZ1) is identified. The virtual coordinates (XYZ1) of the virtual user (104) is communicated to the payment terminal (105). In an alternate embodiment, the virtual coordinates (XYZ1) of the virtual user (104) are sent to the payment terminal (105) upon the physical user (101) pressing the transaction button housed on the VR device (102), or by providing the voice command. In an embodiment, the virtual coordinates can be cylindrical, spherical coordinates, or any other co-ordinate system known to a person skilled in the art.

Referring back to FIG. 4, at the step 402, the payment terminal (105) determines merchant (107) and associated details corresponding to one of the one or more establishments based on the location information (304) of the virtual user (104) sent by the VR device (102). The payment terminal (105) determines the merchant (107) and associated details upon the physical user (101) initiating payment for the transaction using a physical payment card in the payment terminal (105). Further, the payment terminal (105) includes a mapping table (205) consisting a plurality of merchant (107) and associated details. The payment terminal (105) determines the merchant (107) and associated details by extracting the merchant (107) and associated details corresponding to the location information (304) of the virtual user (104) from a mapping table (205). In an embodiment, the payment terminal (105) comprises the mapping table (205) having the virtual location of a plurality of merchants (establishments/shops in the virtual environment (103)). reference is again made to the example as shown in FIG. 6. Upon receiving the virtual coordinates (XYZ1) of the virtual user (104) the payment terminal (105) can compute a distance between the virtual coordinates (XYZ1) and virtual coordinates of each of the one or more establishments in the virtual environment (103). Further, an establishment is identified where the virtual user (104) is transacting in the virtual environment (103) based on the shortest distance. In another embodiment, a boundary can be defined for each establishment. When the virtual user (104) is transacting while being inside/on the defined boundary of an establishment in the virtual environment (103), then the virtual user (104) can be considered to be transacting in the establishment. In such case, the virtual coordinates (XYZ1) can be compared with the defined boundary to identify the establishment in which the virtual user (104) is transacting. Further, the merchant (107) and the associated details is extracted from the mapping table (205).

At the step 403, the payment terminal (105) sends a transaction message comprising the merchant (107) and associated details to an issuer system (110) via a gateway associated with the merchant (107) for authorization. The gateway associated with the merchant (107) is selected from the mapping table (205). Typically, a payment gateway supports only one merchant. As the payment terminal (105) is configured for a plurality of merchants, each merchant is associated with its gateway. For example, referring to FIG. 6, for a merchant having merchant ID as "ID-1" the corresponding payment gateway is "Gateway1". Hence, if the physical user (101) has transacted at a shop in the virtual environment (103) corresponding to the merchant having ID-1, then the payment terminal (105) uses the gateway Gateway-1 corresponding to the merchant having ID-1 to process the transaction. The merchant (107) sends the transaction message to the the acquirer (108) via the gateway. Further, the acquirer (108) sends the authorization request to network server (109) and the network server (109) forwards the authorization request to the issuer system (110).

At the step 404, the payment terminal (105) receives a result of authorization of the transaction message from the issuer system (110) via the gateway. The issuer system (110) provides a response to the authorization request from the network server (109). The network server (109) forwards the issuer system's (110) authorization response to the acquirer (108) and the acquirer (108) forwards the authorization response to the merchant (107) via the gateway. Finally, the merchant (107) completes the transaction by displaying appropriate message on the payment terminal (105) to the physical user (101).

In an embodiment, the authorization and authentication of a transaction may be performed using two factor authentication and/or 3-D secure techniques.

Figure 5:
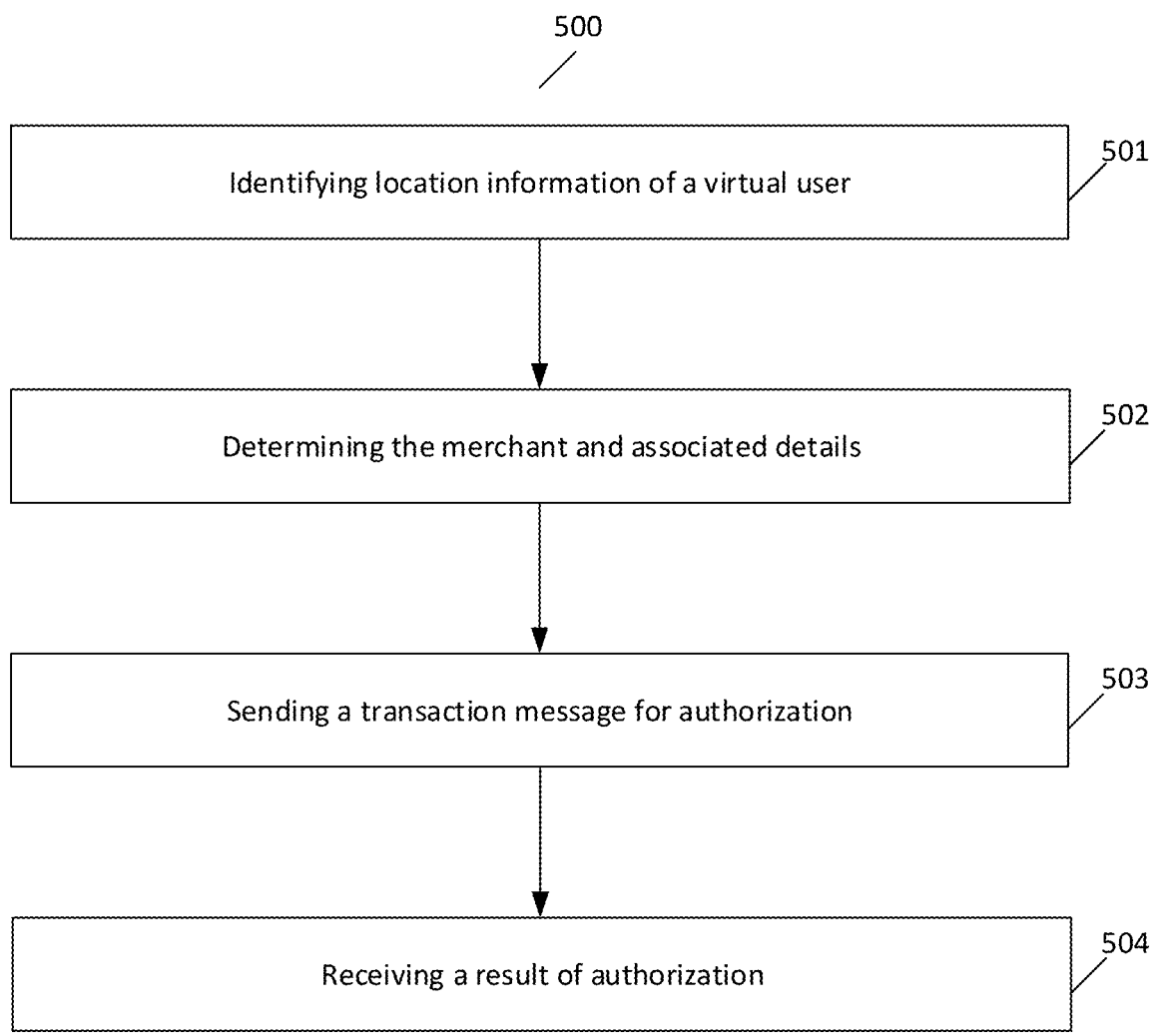
FIG. 5 shows a flow chart illustrating method steps for dynamic merchant configuration in a virtual reality device for transacting in a virtual environment, in accordance with an embodiment of the present disclosure.

FIG. 5 shows a flow chart illustrating method steps for dynamic merchant (107) configuration in a virtual reality device (102) for transacting in a virtual environment (103), in accordance with an embodiment of the present disclosure. The physical user (101) equipped with a virtual reality device (102) includes a virtual environment (103) and a virtual user (104) navigating in a virtual environment (103). The virtual user (104) may purchase or order consumables or goods from one or more establishments in the virtual environment (103) and the physical user (101) presents a physical payment card to the payment terminal (105) for the payment. Further, the payment terminal (105) completes the payment process.

The order in which the method 500 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At the step 501, a Virtual Reality (VR) device (102) identifies location information (304) of the virtual user (104) corresponding to a physical user (101), performing a transaction in one of the one or more establishments configured in a virtual environment (103). For example, as shown in FIG. 6 (XYZ1) represents the virtual coordinates of the virtual user (104), the virtual coordinates (XYZ2) represents an establishment or shop. Upon the virtual user (104) initiating a buying of the goods or the consumables based on the actions performed by the physical user (101) or the voice command issued by the physical user (101) or pressing the transaction button housed on the VR device (102), the virtual coordinates of the virtual user (104) (XYZ1) is identified.

At the step 502, the VR device (102) determines a merchant (107) and associated details corresponding to one of the one or more establishments based on the location information (304). The merchant (107) and associated details is extracted from the mapping table (205) stored in the VR device (102) based on the virtual location of the user. For example, as shown in FIG. 6 (XYZ1) represents the virtual coordinates of the virtual user (104), the virtual coordinates (XYZ2) represents an establishment or shop. Based on the virtual coordinates (XYZ1) of the virtual user (104) the VR device (102) can compute distance with the virtual coordinates of the one or more establishments in the virtual environment (103) and identify the establishment based on the shortest distance. Further, the merchant (107) and the associated details is extracted based on the virtual coordinates (XYZ2) of the identified establishment from the mapping table (205) as shown in the table of FIG. 6.

At the step 503, the VR device (102) sends the merchant (107) and associated details to a payment terminal (105) upon the physical user (101) initiating payment for the transaction using a physical payment card in the payment terminal (105), wherein the payment terminal (105) sends the transaction message comprising the merchant (107) and associated details to an issuer system (110) via a gateway associated with the merchant (107) for authorization. The gateway associated with the merchant (107) is selected from the mapping table (205). The merchant (107) sends the transaction message to the the acquirer (108) via the gateway. Further, the acquirer (108) sends the authorization request to network server (109) and the network server (109) forwards the authorization request to the issuer system (110).

At the step 504, the payment terminal (105) receives a result of authorization of the transaction message from the issuer system (110) via the gateway. The issuer system (110) provides a response to the authorization request from the network server (109). The network server (109) forwards the issuer system's (110) authorization response to the acquirer (108) and the acquirer (108) forwards the authorization response to the merchant (107) via the gateway. Finally, the merchant (107) completes the transaction.

In an embodiment, the authorization and authentication of a transaction may be performed using two factor authentication and/or 3-D secure techniques. A transaction is complete when the cardholder is authenticated, and the transaction is authorised by an issuer system (issuer bank or trusted third-party system). Typically, two request messages are generated, e.g., a Payment Authentication Request (PAReq) message and a payment authorisation request message. A merchant system generates the PAReq message and an acquirer system generates the payment authorisation request message. The PAReq is processed first by the issuer system to authenticate the cardholder. During authentication, the OTP is generated by the issuer system. The OTP is generally sent to cardholder's registered mobile number and/or registered email. The cardholder then inputs the OTP in a merchant check-out page. The OTP received from the cardholder is compared with the generated OTP to authenticate the cardholder. Upon successful authentication, the payment authorisation request message is generated which is again provided to the issuer system. During authorisation, the transaction is validated based on many factors including account balance, security of transaction and such details.

FIG. 6 shows an exemplary mapping table (205) associated with a virtual environment (103), in accordance with an embodiment of the present disclosure. The virtual environment (103) shown in FIG. 6 includes four establishments or stores and a virtual user (104) ordering or buying a good or a consumable from the establishment named "SHOP3" having a virtual co-ordinate (XYZ2). Upon the virtual user (104) ordering or buying a good or a consumable, the VR device (102) identifies the virtual coordinates of the virtual user (104) (XYZ1) as shown in FIG. 6. The identified virtual coordinates are sent to the payment terminal (105). The payment terminal (105) computes the distance from the virtual user (104) (XYZ1) with the virtual coordinates (XYZ4) of the "SHOP1", (XYZ3) of the "SHOP2", (XYZ2) of the "SHOP3" and (XYZ5) of the "SHOP4". Further, the payment terminal (105) chooses the "SHOP3" having a shortest distance with the virtual coordinates of virtual user (104). The payment terminal (105) extracts the merchant (107) and the associated details of the "SHOP3" from the mapping table (205) as shown in table of FIG. 6 based on the virtual coordinates of the "SHOP3" and completes the transaction upon the physical user (101) initiating payment for the transaction using a physical payment card in the payment terminal (105).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Thus, system and computer implemented method for dynamic merchant (107) configuration in a payment terminal (105) for transacting in a virtual environment (103) enables a user or customer to make payments for purchasing consumables or goods in a virtual environment (103) using a physical. Further, a payment terminal (105) is configured to change the merchant (107) and gateway based on the virtual location of a consumer or a user in a virtual environment (103). Thus, the payment terminal (105) is agnostic of the merchant's (107) gateway or acquirers (108) gateway. Furthermore, payments in virtual environment (103) to a real vendor in the physical world is achieved without the involvement of the intermediaries. Thus, the money gets transferred directly to the merchant's (107) bank account.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A method comprising:
 receiving a transaction request initiated from within a virtual environment by a user operating a Virtual Reality (VR) device, the transaction request associated with an account identifier of the user and transaction data;
 determining a virtual location from which the transaction request was initiated from a plurality of different virtual locations within the virtual environment;
 determining a merchant from a plurality of merchants within the virtual environment based on the virtual location of the user within the virtual environment and a mapping table comprising mappings between merchant identifiers and virtual coordinates or boundaries within the virtual environment, each merchant identifier in the mapping table corresponding to a payment gateway configuration of a plurality of payment gateway configurations;

generating a transaction message based on the merchant, the account identifier of the user, and the transaction data;

selecting a payment gateway configuration from the plurality of payment gateway configurations based on the merchant identifier; and initiating a payment transaction based on the transaction message and the payment gateway configuration.

2. The method of claim 1, wherein determining the virtual location of the user is based on virtual coordinates of a virtual user representing the user within the virtual environment.

3. The method of claim 1, further comprising configuring a payment gateway based on the payment gateway configuration.

4. The method of claim 1, further comprising sending the transaction message to a payment gateway associated with the payment gateway configuration.

5. The method of claim 1, wherein the transaction request is received by a payment terminal configured to accept transactions for the plurality of merchants, and wherein each merchant of the plurality of merchants is associated with a gateway of a plurality of gateways in communication with the payment terminal.

6. A payment terminal comprising at least one processor configured to:

receive a transaction request initiated from within a virtual environment by a user operating a Virtual Reality (VR) device, the transaction request associated with an account identifier of the user and transaction data;

determine a virtual location from which the transaction request was initiated from a plurality of different virtual locations within the virtual environment;

determine a merchant from a plurality of merchants within the virtual environment based on the virtual location of the user within the virtual environment from which the transaction request was initiated and a mapping table comprising mappings between merchant identifiers and virtual coordinates or boundaries within visual environment, each merchant identifier in the mapping table corresponding to a payment gateway configuration of a plurality of payment gateway configurations;

generate a transaction message based on the merchant, the account identifier of the user, and the transaction data;

select a payment gateway configuration from the plurality of payment gateway configurations based on the merchant identifier; and initiate a payment transaction based on the transaction message and the payment gateway configuration.

7. The payment terminal of claim 6, wherein determining the virtual location of the user is based on virtual coordinates of a virtual user representing the user within the virtual environment.

8. The payment terminal of claim 6, wherein the at least one processor is further configured to configure a payment gateway based on the payment gateway configuration.

9. The payment terminal of claim 6, wherein the at least one processor is further configured to send the transaction message to a payment gateway associated with the payment gateway configuration.

10. The payment terminal of claim 6, wherein the transaction request is received by a payment terminal configured to accept transactions for the plurality of merchants, and wherein each merchant of the plurality of merchants is associated with a gateway of a plurality of gateways in communication with the payment terminal.

11. A computer program product comprising at least one non-transitory computer-readable medium including program instructions that, when executed by at least one processor, cause the at least one processor to:

receive a transaction request initiated from within a virtual environment by a user operating a Virtual Reality (VR) device, the transaction request associated with an account identifier of the user and transaction data;

determine a virtual location from which the transaction request was initiated from a plurality of different virtual locations within the virtual environment;

determine a merchant from a plurality of merchants within the virtual environment based on the virtual location of the user within the virtual environment from which the transaction request was initiated and a mapping table comprising mappings between merchant identifiers and virtual coordinates or boundaries within visual environment, each merchant identifier in the mapping table corresponding to a payment gateway configuration of a plurality of payment gateway configurations;

generate a transaction message based on the merchant, the account identifier of the user, and the transaction data;

select a payment gateway configuration from the plurality of payment gateway configurations based on the merchant identifier; and initiate a payment transaction based on the transaction message and the payment gateway configuration.

12. The computer program product of claim 11, wherein determining the virtual location of the user is based on virtual coordinates of a virtual user representing the user within the virtual environment.

13. The computer program product of claim 11, wherein the program instructions further cause the at least one processor to configure a payment gateway based on the payment gateway configuration.

14. The computer program product of claim 11, wherein the program instructions further cause the at least one processor to send the transaction message to a payment gateway associated with the payment gateway configuration.

15. The computer program product of claim 11, wherein the transaction request is received by a payment terminal configured to accept transactions for the plurality of merchants, and wherein each merchant of the plurality of merchants is associated with a gateway of a plurality of gateways in communication with the payment terminal.

* * * * *